3,148,978
ALLOYS
Douglas White, Fulwood, Preston, John Frederick George Conde, Weymouth, Dorset, and Peter Charles Leslie Pfeil, Abingdon, England, assignors to United Kingdom Atomic Energy Authority, London, England
No Drawing. Filed Jan. 27, 1961, Ser. No. 85,215
Claims priority, application Great Britain Feb. 2, 1960
10 Claims. (Cl. 75—122.5)

This invention relates to alloys.

The sheaths of fuel elements for gas- or vapour-cooled nuclear reactors must be capable of protecting the nuclear fuel from reaction with the gaseous coolant employed and furthermore must be capable of retaining fission products produced in the fuel as a result of irradiation in the reactor. The material chosen for the sheaths must have good neutron economy, good corrosion resistance to both fuel and coolant at elevated temperatures (e.g. 650°–750° C.) and, in the case of the coolant, at elevated pressures (e.g. about 300 p.s.i.) for long periods (at least one year); must retain good creep strength and ductility and have good corrosion fatigue properties under conditions of thermal cycling; must be free from inclusions particularly where the sheath wall is extremely thin (e.g. .005"); must be capable of fabrication, i.e. by forging, drawing into tubes, subsequent machining to size and if desired to produce surface roughening to improve heat transfer, and welding to close the sheaths after filling; and must be fine-grained with negligible grain growth under stress. Austenitic stainless steels are considered generally to possess these desirable properties in a greater or lesser degree insofar as use for the sheaths of nuclear reactor fuel elements in which the fuel is fissile ceramic and either carbon dioxide or steam both under pressure is employed as the external coolant.

It is an object of the invention to provide austenitic stainless steels the composition of which is calculated to produce optimum compromise of properties as aforesaid.

According to the invention, austenitic stainless steels comprise up to 0.07% carbon, 0.5–1.0% manganese, 0.25–0.75% silicon, 24–26% nickel, 19–21% chromium, 0–0.75% niobium or alternatively 0–0.5% titanium, remainder iron and incidental impurities, the maximum amount present of carbon being 0.03% when neither niobium nor titanium is present, the percentages being by weight.

A preferred more limited range of constituents comprises 0.03–0.06% carbon, 0.55–0.85% manganese, 0.45–0.75% silicon, 24–26% nickel, 19–21% chromium, not less than ten times the carbon content and not more than 0.7% niobium, remainder iron and incidental impurities.

The alloys are preferably prepared by vacuum induction melting followed by vacuum arc melting, or alternatively by air melting followed by vacuum arc melting performed at least once.

The following are examples of alloys according to the invention:

| Examples | 1 | 2 | 3 | 4 | 5 | 6 | 7 |
|---|---|---|---|---|---|---|---|
| Wt. percent C | 0.06 | 0.03 | 0.06 | 0.05 | 0.05 | 0.07 | 0.03 |
| Wt. percent Mn | 0.72 | 0.64 | 0.82 | 0.76 | 0.76 | 0.93 | 0.71 |
| Wt. percent Si | 0.38 | 0.45 | 0.4 | 0.33 | 0.29 | 0.40 | 0.39 |
| Wt. percent Ni | 25.3 | 26.0 | 24.6 | 25.2 | 26.2 | 26.0 | 25.8 |
| Wt. percent Cr | 20.1 | 20.1 | 19.8 | 20.2 | 20.0 | 20.5 | 20.2 |
| Wt. percent Nb | 0.65 | 0.70 | 0.61 | 0.70 | 0.69 | 0.61 | 0.61 |
| Wt. percent Fe and impurities | (1) | (1) | (1) | (1) | (1) | (1) | (1) |

[1] Remainder.

Stress rupture and creep tests in air at 750° C. on bar alloy according to Example 1 gave the following results:

| Stress (tons/in.$^2$) | Time to Rupture (hrs.) | Percent Elongation |
|---|---|---|
| 5 | 279 | 32.19 (1" gauge length) |
| 4 | 579 | 29.6 (1" gauge length) |
| 3 | 2,022 | 42.8 (1" gauge length) |
| 2 | 3,843 | 38.8 (6" gauge length) |

Stress rupture and creep tests in $CO_2$ at 750° C. on 0.002" strip alloy according to the said Example 1 gave the following results:

| Stress (tons/in.$^2$) | Time to Rupture (hrs.) | Percent Elongation (2" gauge length) |
|---|---|---|
| 4 | 321 | 17.1 |
| 3.5 | 716 | 18.9 |
| 3 | 929 | 12.4 |
| 2.6 | 1,293 | 15.6 |

Tests to confirm stability under long term heating on the alloy according to Example 1 aforesaid gave the following results:

| Time at 750° (hrs.) | Nil | 1 | 50 | 100 | 250 | 500 |
|---|---|---|---|---|---|---|
| Percent elongation | 46.5 | 46.5 | 44 | 44 | 44 | 44 |
| Impact strength, Izod. ft. lb | 100 | 96 | 99 | 99 | 95 | 95 |

Compatibility tests with $CO_2$ and with $CO_2$ with a small addition of CO on the alloy according to Example 1 aforesaid gave the following results:

| | Weight gain, mg./cm.$^2$ | | | | Penetration (.001" units) | | | |
|---|---|---|---|---|---|---|---|---|
| Temperature | 650° C. | | 800° C. | | 650° C. | | 850° C. | |
| Atmosphere | $CO_2$ | $CO_2$+5% CO | $CO_2$ | $CO_2$+5% CO | $CO_2$ | $CO_2$+5% CO | $CO_2$ | $CO_2$+5% CO |
| Time (hrs.) | 3,200 | 1,000 | 3,200 | 4,200 | 2,300 | 3,300 | 1,800 | 1,000 | 1,800 | 1,000 |
| | 0.16 | 0.09 | 0.27 | 0.30 | 0.44 | 0.58 | Nil | Nil | 0.1 | 0.1 |

Longer term compatibility tests and weldability tests proved satisfactory.

The preferred method of manufacture of sheaths for nuclear reactor fuel elements is double vacuum melting, i.e. high frequency or induction vacuum melting followed by vacuum arc melting, forging, drawing into thin walled tubes, machining the external wall of each tube to size and to provide a helical rib (for improved heat transfer with the coolant during operation in a nuclear reactor), filling each tube with $UO_2$ pellets (with which the steel is compatible at elevated temperatures), and welding end caps onto each tube at each end thereof. A typical tube wall thickness for the sheaths is 0.010″.

As an alternative to niobium stabilised alloys, unstabilised alloys containing low carbon to ensure freedom from carbide precipitations effects, are envisaged. Such unstabilised alloys generally contain less than 0.03% and preferably about 0.02% C. A typical example is as follows:

Example 8.—0.02% C, 0.72% Mn, 0.38% Si, 25.3% Ni, 20.1% Cr, remainder Fe and impurities.

As a further alternative, titanium stabilised alloys are envisaged. In these cases, carbon is preferably present in similar proportions as for niobium stabilised alloys, and titanium is present in amounts up to 0.5%. A typical example is as follows:

Example 9.—0.06% C, 0.72% Mn, 0.38% Si, 25.3% Ni, 20.1% Cr, 0.35% Ti, remainder Fe and impurities.

In the use of the alloys for fabrication of parts having nuclear reactor applications, particularly in cases where the operative position of the parts is in the core of the reactor, the amount of incidental impurities may be of importance, particularly from the point of view of neutron economy, and also from the point of view of degradation of important properties. Common impurities present in the alloys according to the invention are sulphur, phosphorus, cobalt, boron, titanium (when not used specifically as stabiliser), zirconium and aluminium. Recommended upper limits of these impurities where the alloys concerned are to be employed for the fabrication of fuel element sheaths, for example, are as follows:

S—not more than 0.02%
P—not more than 0.02%
B—not more than 0.0005%
Co—not more than 0.015%
Ti—not more than 0.05%
Zr—not more than 0.05%
Al—not more than 0.05%

Furthermore, in order to avoid background which would interfere with burst slug detection, alloys for parts whose operative position is in the core of a nuclear reactor should not contain more than ½ part per million of uranium.

We claim:

1. Austenitic stainless steel alloys consisting essentially of less than 0.07% carbon, 0.5–1% manganese, 0.25–0.75% silicon, 24–26% nickel, 19–21% chromium, up to 0.75% niobium, remainder iron and incidental impurities, the percentages being by weight.

2. Austenitic stainless steel alloys consisting essentially of 0.03 to 0.06% carbon, 0.5–1% manganese, 0.25–0.75% silicon, 24–26% nickel, 19–21% chromium, up to 0.5% titanium, remainder iron and incidental impurities, the percentages being by weight.

3. Austenitic stainless steel alloys consisting essentially of up to 0.03% carbon, 0.5–1% manganese, 0.25–0.75% silicon, 24–26% nickel, 19–21% chromium, remainder iron and incidental impurities, the percentages being by weight.

4. Alloys according to claim 1, consisting essentially of 0.03–0.06% carbon, 0.55–0.85% manganese, 0.45–0.75% silicon, 24–26% nickel, 19–21% chromium, not less than ten times the carbon content and not more than 0.7% niobium, remainder iron and incidental impurities.

5. For fabrication of parts intended for employment in the core of a nuclear reactor, alloys according to claim 4 and having the following upper limits of incidental impurities, namely 0.02% each sulphur and phosphorous, 0.001% boron, 0.015% cobalt, 0.05% each titanium, zirconium and aluminium, and ½ part per million uranium.

6. An alloy consisting essentially of 0.06% carbon, 0.72% manganese, 0.38% silicon, 25.3% nickel, 20.1% chromium, 0.65% niobium, remainder iron and incidental impurities, the percentages being by weight.

7. An alloy according to claim 6, wherein the niobium content is replaced by 0.35% titanium.

8. An alloy consisting essentially of 0.02% carbon, 0.72% manganese, 0.38% silicon, 25.3% nickel, 20.1% chromium, remainder iron and incidental impurities, the percentages being by weight.

9. Alloys according to claim 1, prepared by vacuum induction melting followed by vacuum arc melting.

10. Alloys according to claim 1, prepared by arc melting followed by vacuum arc melting performed at least once.

References Cited in the file of this patent

UNITED STATES PATENTS 2,190,486    Schafmeister _____ Feb. 13, 1940

FOREIGN PATENTS 538,137    Canada _____ Mar. 12, 1957